US012746505B2

(12) United States Patent
Kang et al.

(10) Patent No.: US 12,746,505 B2
(45) Date of Patent: Sep. 29, 2026

(54) HYBRID STRUCTURE, MANUFACTURING METHOD FOR THE SAME, AND FOG CAPTURE INCLUDING THE SAME

(71) Applicant: RESEARCH & BUSINESS FOUNDATION SUNGKYUNKWAN UNIVERSITY, Suwon-si (KR)

(72) Inventors: Dae-Joon Kang, Suwon-si (KR); Hyunje Park, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 916 days.

(21) Appl. No.: 17/984,729

(22) Filed: Nov. 10, 2022

(65) Prior Publication Data

US 2023/0158448 A1 May 25, 2023

(30) Foreign Application Priority Data

Nov. 11, 2021 (KR) ........................ 10-2021-0154380

(51) Int. Cl.
*C25B 11/00* (2021.01)
*B01D 53/26* (2006.01)
*B05D 3/14* (2006.01)

(52) U.S. Cl.
CPC ............ *B01D 53/265* (2013.01); *B05D 3/14* (2013.01); *B01D 2257/80* (2013.01)

(58) Field of Classification Search
CPC ..... B01D 53/265; B01D 3/14; B01D 2257/80
See application file for complete search history.

(56) References Cited

U.S. PATENT DOCUMENTS

2004/0109981 A1 6/2004 Lawrence et al.

FOREIGN PATENT DOCUMENTS

CN 210328706 U 4/2020
KR 10-2003-0094360 A 12/2003

OTHER PUBLICATIONS

Swarit et al. (“Formation and control of secondary nanostructures in electro-hydrodynamic patterning of ultra-thin films”; pp. 241-251; Elsevier) (Year: 2017).*
Kang, Daejun, et al. “Development and Application of Novel Nanoscale Pattern Transfer Technology for Functional Inorganic Materials Using Electrohydrodynamics” Final Report of General Research Support Project, *Sungkyunkwan University* (*Natural Science Campus*), May 30, 2014, (69 pages in English, 70 pages in Korean).
Korean Office Action issued on May 10, 2023, in counterpart Korean Patent Application No. 10-2021-0154380 (8 pages in Korean).
Al-Khayat, Omar, et al. “Patterned polymer coatings increase the efficiency of dew harvesting.” *ACS applied materials & interfaces* vol. 9 Issue 15 (Feb. 22, 2017): pp. 1-9.

* cited by examiner

*Primary Examiner* — Zulmariam Mendez
(74) *Attorney, Agent, or Firm* — LEX IP MEISTER, PLLC

(57) ABSTRACT

The present application relates to a hybrid structure including a substrate, a fluid thin film formed on the substrate, first structures formed on the fluid thin film by primary electrohydrodynamic instability, and second structures formed between the first structures and formed by secondary electrohydrodynamic instability, wherein the first structures have hydrophobicity, and the second structures have hydrophilicity.

9 Claims, 10 Drawing Sheets

[FIG.1]
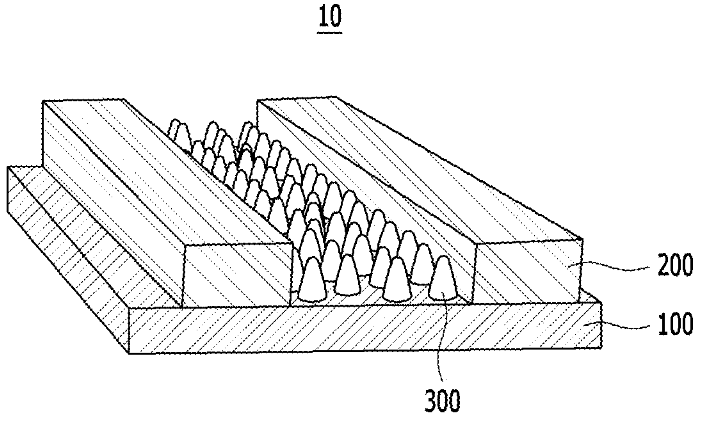
[FIG. 2]
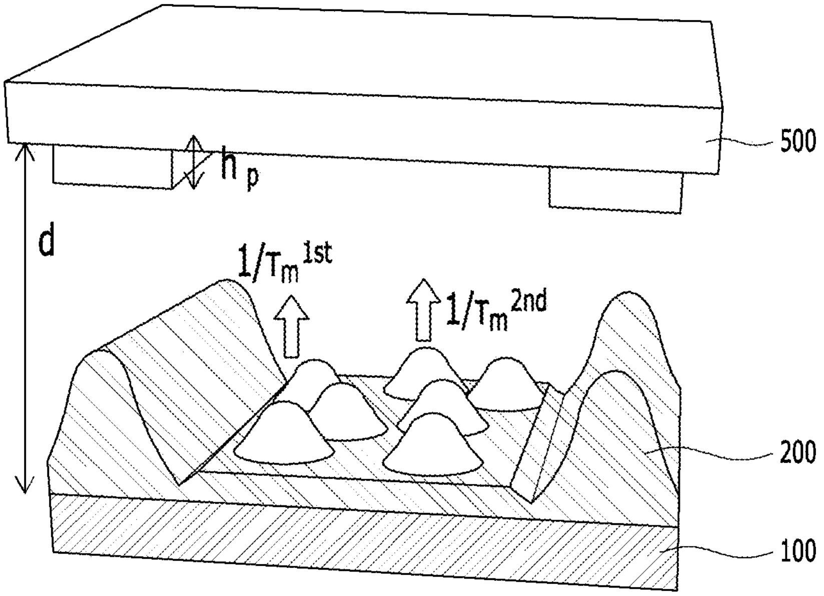

[FIG. 3]
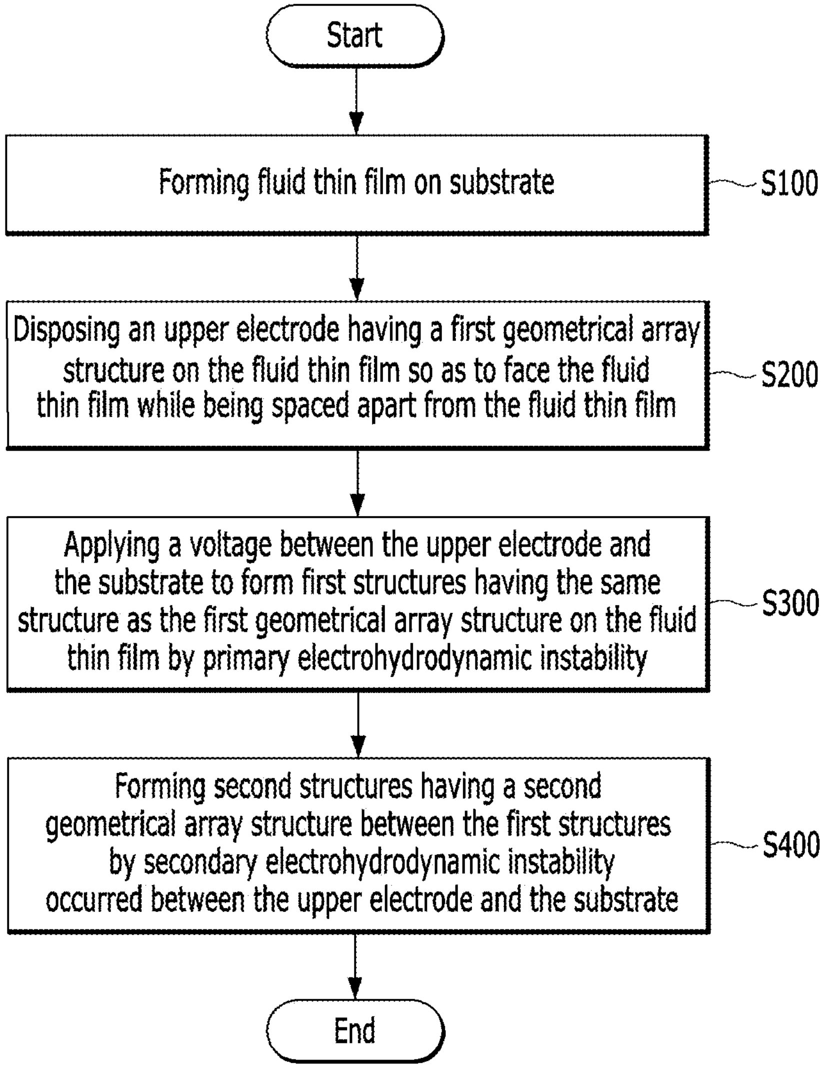

[FIG. 4]
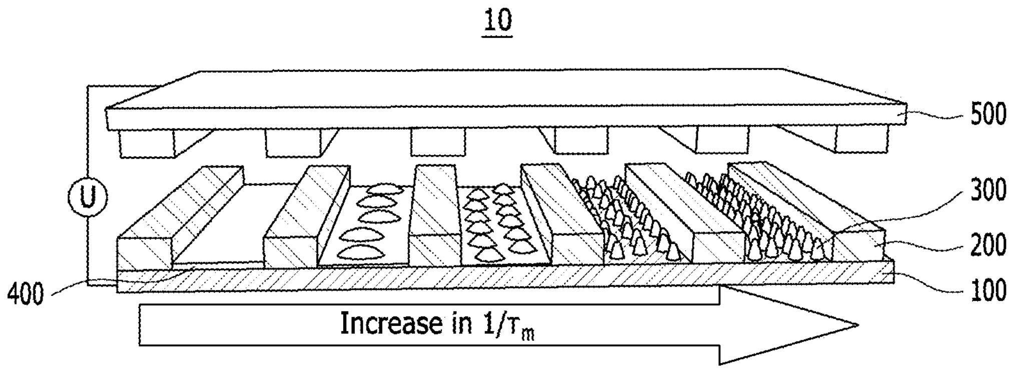
[FIG. 5]
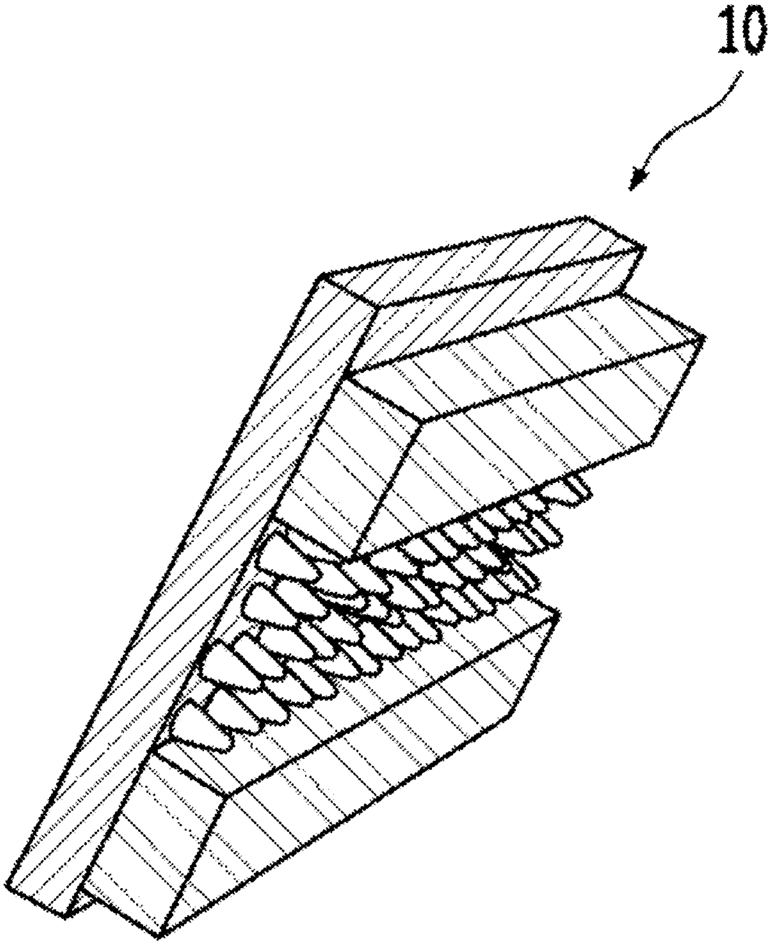

[FIG. 6]
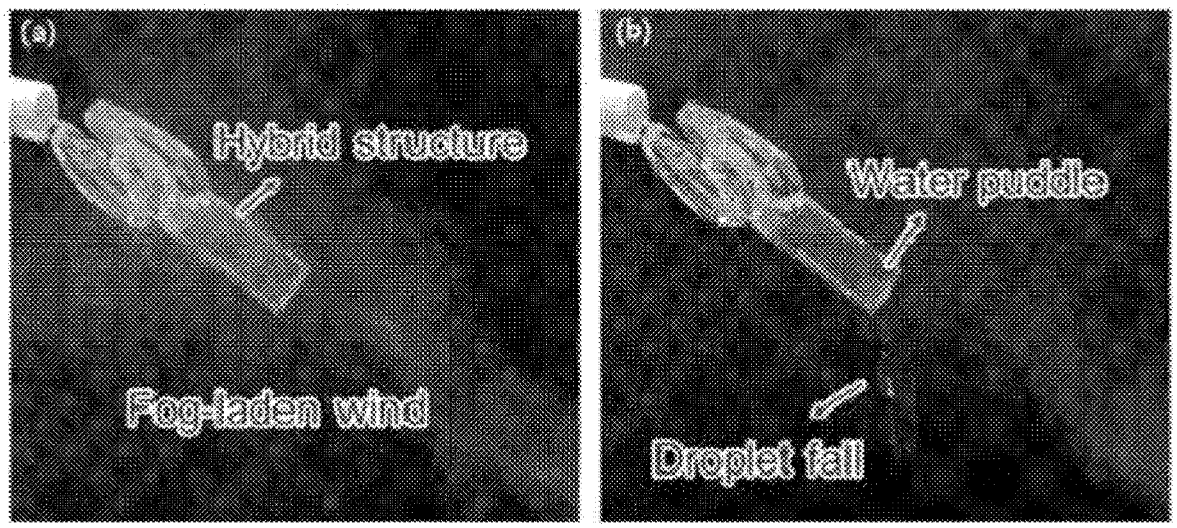

[FIG. 7]
(a)
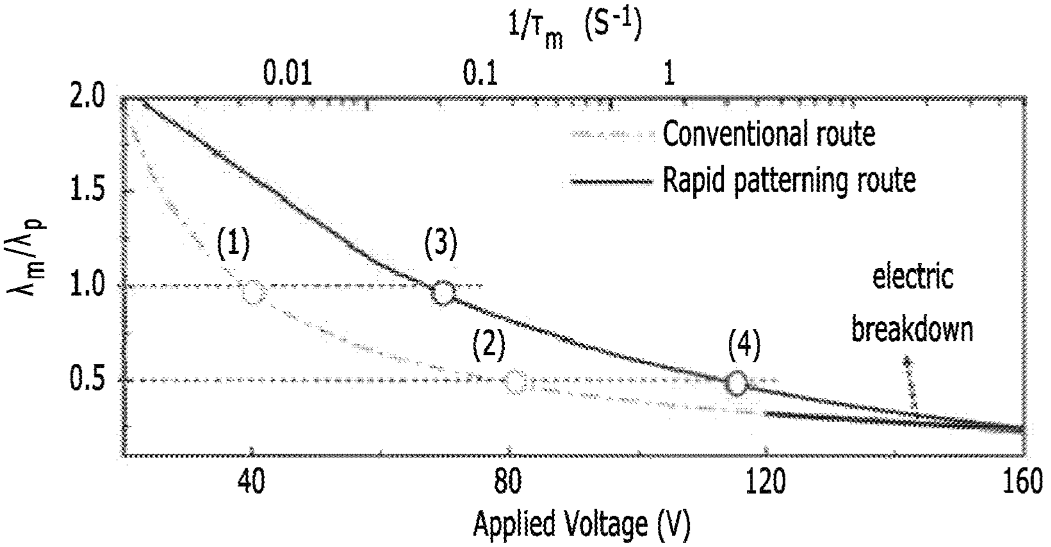
(b)
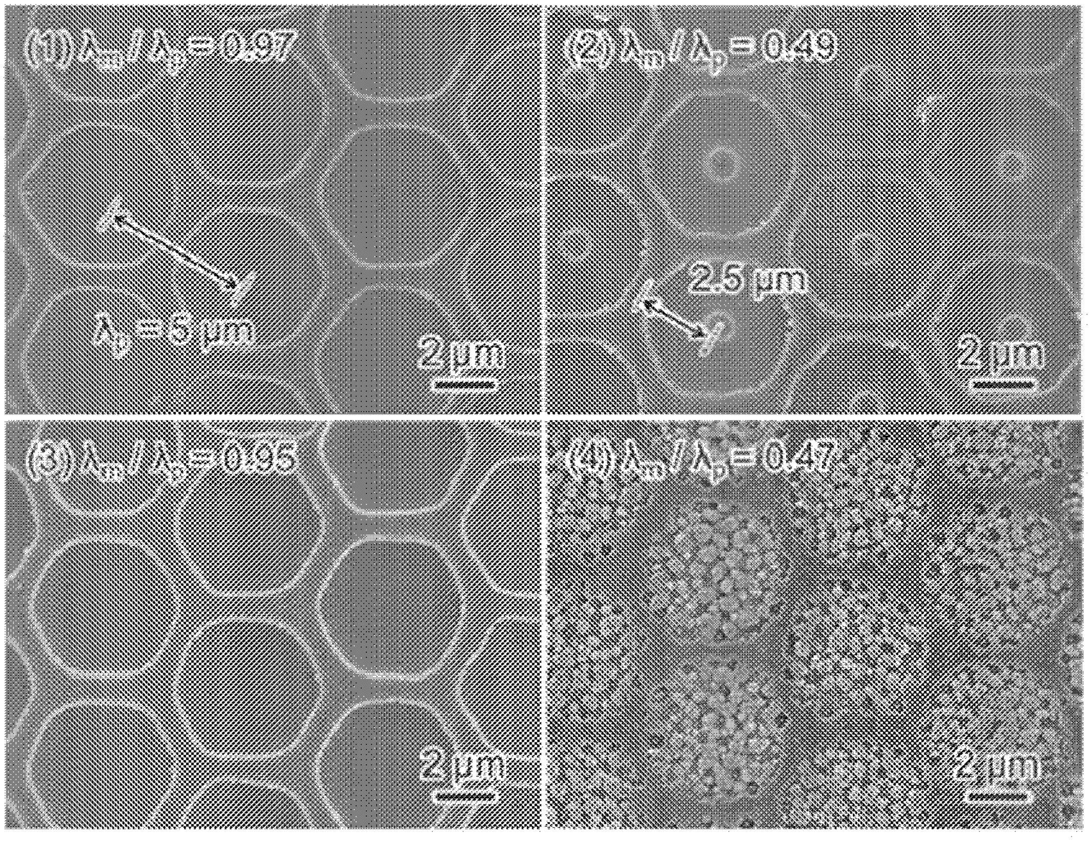

[FIG. 8]
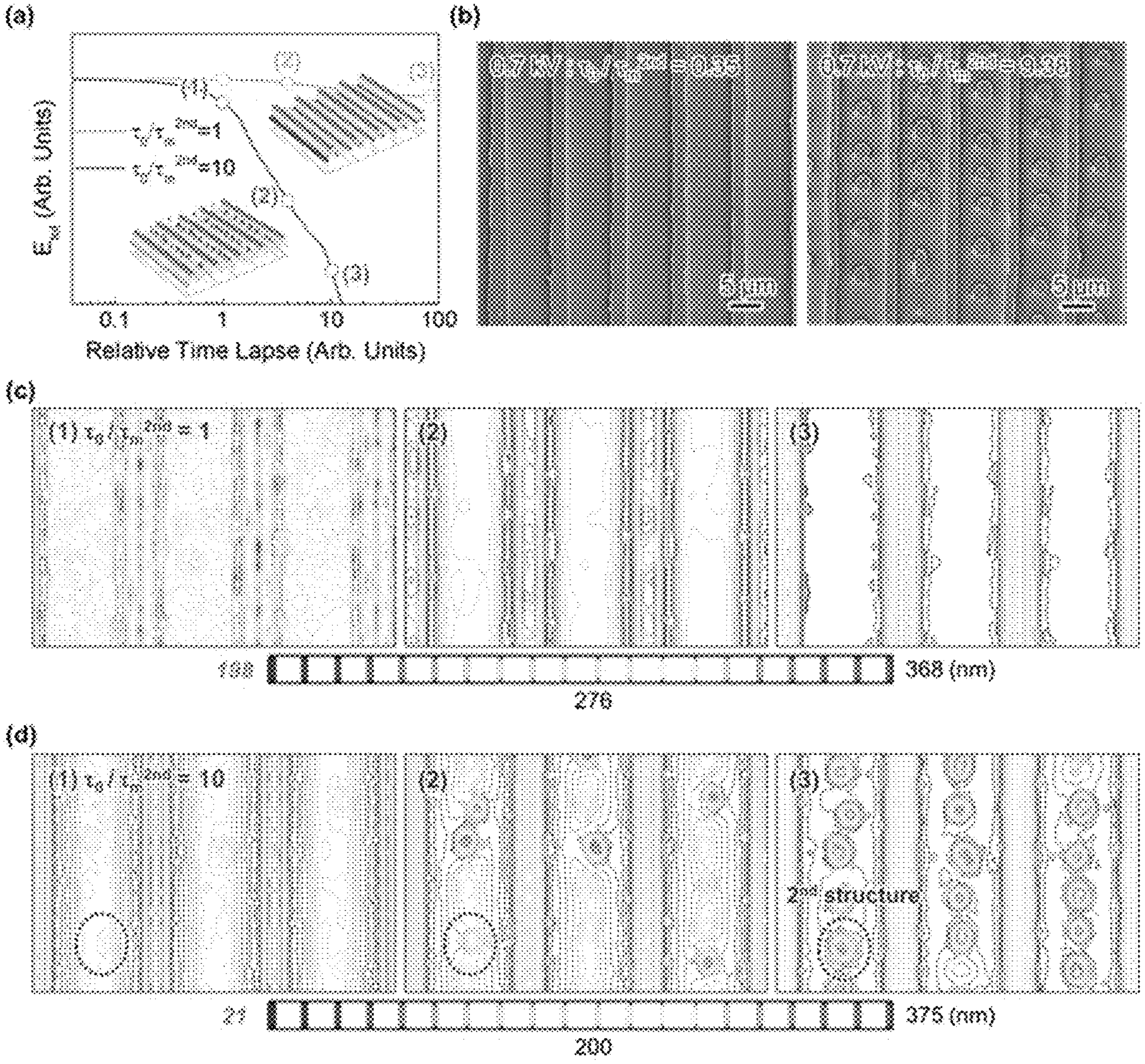

[FIG. 9]
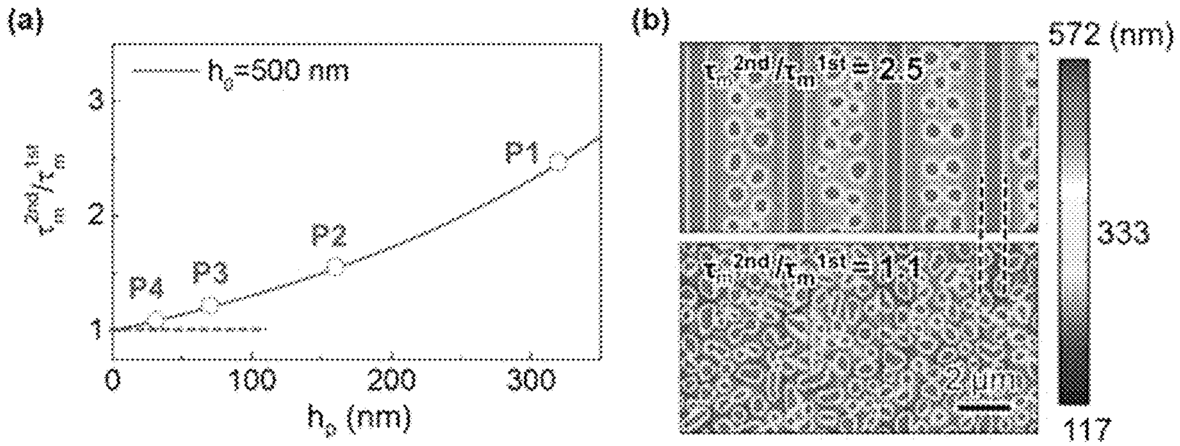
[FIG. 10]
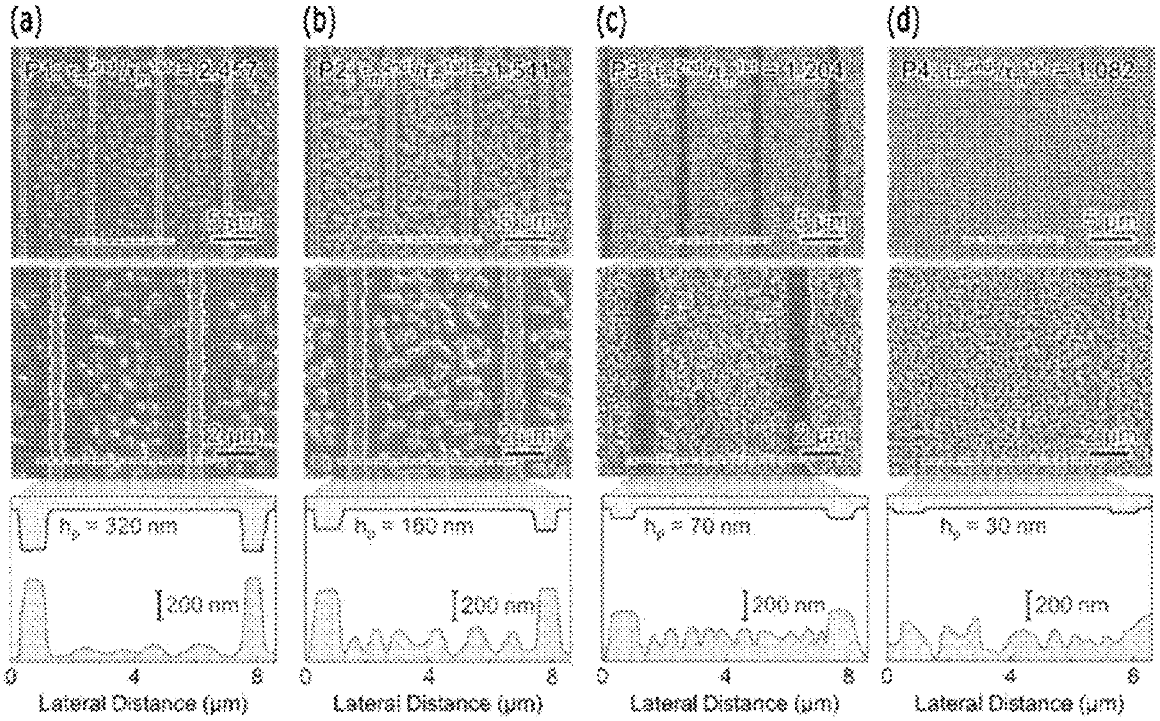

[FIG. 11]
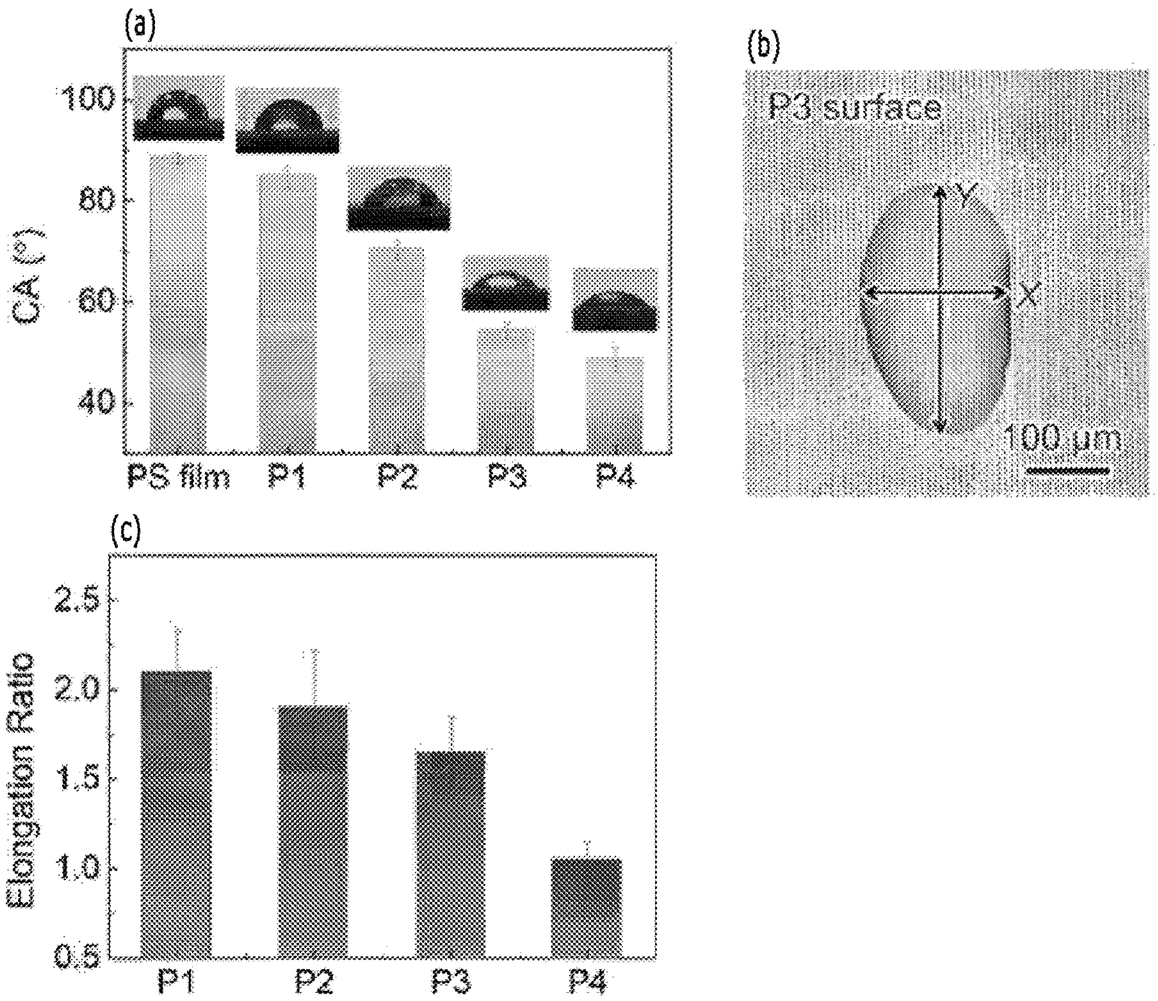

[FIG. 12]
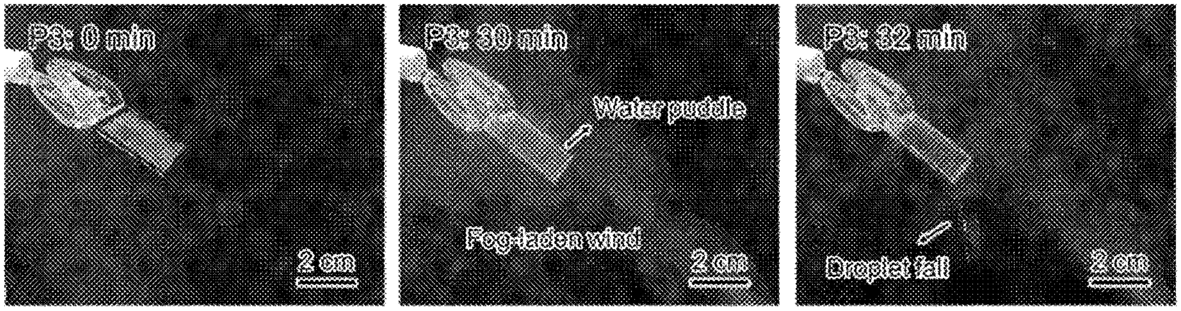
[FIG. 13]
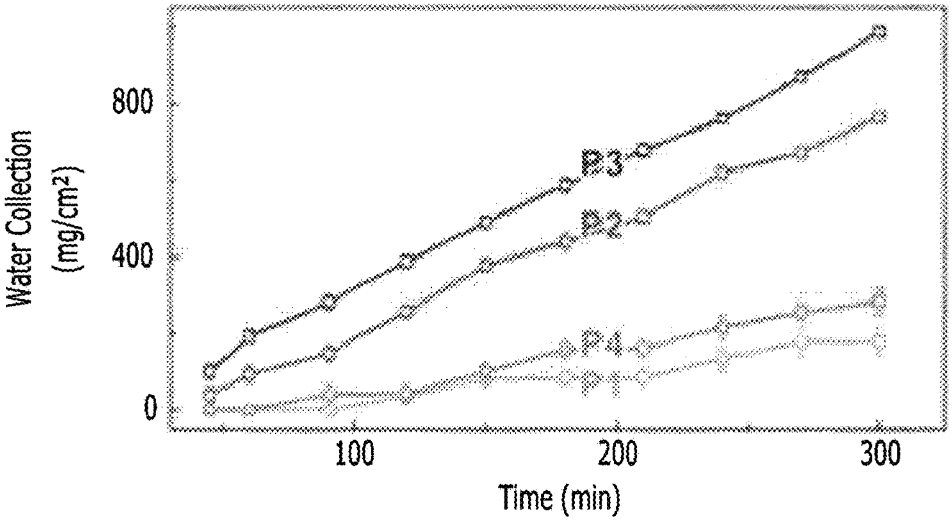

[FIG. 14]
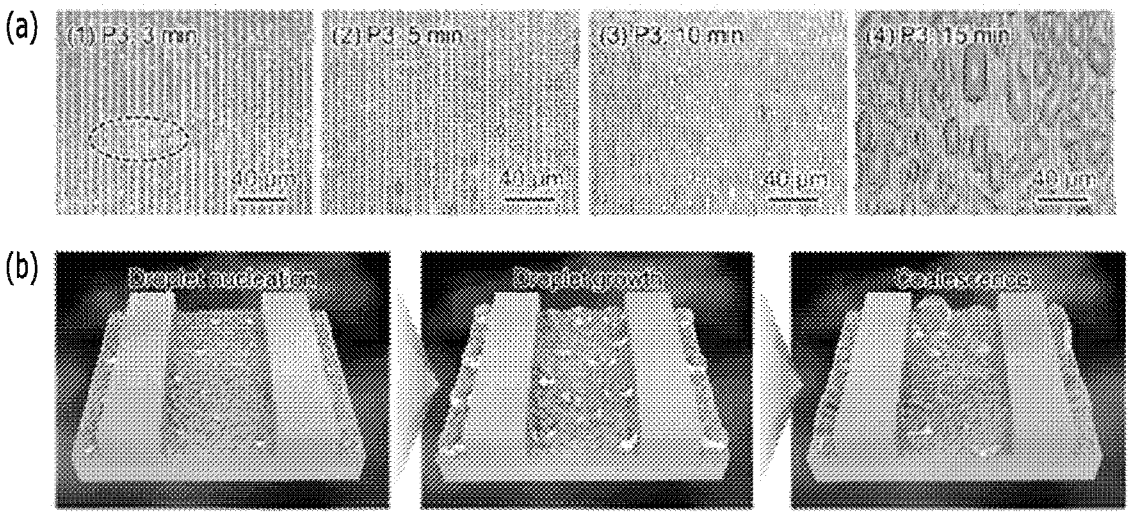
[FIG. 15]
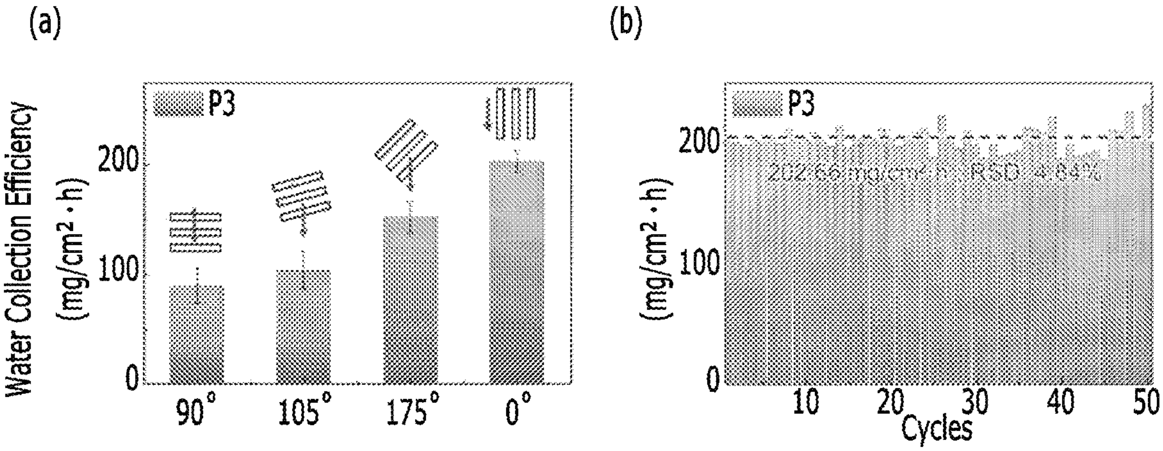

HYBRID STRUCTURE, MANUFACTURING METHOD FOR THE SAME, AND FOG CAPTURE INCLUDING THE SAME

CROSS REFERENCE TO RELATED APPLICATIONS

This application claims the benefit under 35 USC 119(a) of Korean Patent Application No. 10-2021-0154380 filed on Nov. 11, 2022, in the Korean Intellectual Property Office, the entire disclosure of which is incorporated herein by reference for all purposes.

FIELD

The present application relates to a hybrid structure, a method for manufacturing the same, and a fog collector including the same.

DESCRIPTION OF THE RELATED ART

A fog collector refers to a device that condenses moisture or water vapor in the air to convert it into water. In the conventional art for collecting fog, a technique, or the like for liquefying water vapor in the atmosphere in contact with the surface of the fog collector by spreading a mesh-type fog collector widely has been proposed. However, the above-described method has had a problem in that the liquefaction of water vapor, i.e., the fog collection performance, is low by using the surface of a structure of a bulk level.

Meanwhile, advances in nanotechnology have made it possible to use a high surface area compared to volume and thus to control various surface properties. Recently, fog collectors are being studied in the direction of controlling surface wetting by increasing heat exchange performance through structural and chemical control at the microscopic level. Accordingly, existing studies consisted of realizing a (super) hydrophilic or (super) hydrophobic surface, and the problem at this time is that the water droplet transportability and condensation performance, which determine the performance of the fog collector, seem to contradict each other. The (super) hydrophilic surface has the advantage that fog is easily condensed, but the strong adhesion between the surface and water deteriorates the transportability of water droplets for collection. On the other hand, in the case of the (super) hydrophobic surface, water droplets may be transported very effectively due to the excellent heat exchange performance. However, since the condensation performance is low in this case, the actual collection effect is not that excellent. Therefore, the surface wetting control occupies a significant portion in the manufacture of the fog collector, but it is necessary to find a balance between the water droplet transportability and the condensation performance in order to improve the surface wetting control performance.

For example, a method for producing a surface in which hydrophobicity and hydrophilicity intersect, such as the surface of the shell of a beetle living in the Namib Desert, has been presented, but the method requires a complicated process and uses a chemical surface treatment control technique in order to control hydrophilicity and hydrophobicity. In this case, problems such as hydrophobicity recovery according to repeated use are well known (Source: Murakami, T.; Kuroda, S.; Osawa, Z. Dynamics of Polymeric Solid Surfaces Treated with Oxygen Plasma: Effect of Aging Media after Plasma Treatment. J. Colloid Interface Sci. 1998, 202 (1), 37-44). In addition, recently, a method for improving the transportability of droplets to be collected as well as hydrophilicity by using a lubricating liquid has been significantly studied. However, in this case, there is a problem in that the concerned lubricating liquid is depleted in a harsh environment such as repeated use or high temperature and high humidity.

The paper (Al-Khayat, O.; Hong, J. K.; Beck, D. M.; Minett, A. I.; Neto, C. Patterned Polymer Coatings Increase the Efficiency of Dew Harvesting. ACS Appl. Mater. Interfaces 2017, 9 (15), 13676-13684), which is the technical background of the present application, presented a method of realizing fog collection through pure surface structure control, but the above-mentioned paper has a problem in that the structural diversity using the phase separation method is poor.

CONTENT OF THE INVENTION

Problem to be Solved

An object of the present application is to provide a hybrid structure in which anisotropic hydrophilicity is implemented through a physical structure and a method for manufacturing the same in order to solve the aforementioned problems of the conventional art.

Further, another object of the present application is to provide a fog collector including the hybrid structure.

However, the technical problems to be achieved by the embodiments of the present application are not limited to the technical problems as described above, and other technical problems may exist.

Problem Solving Means

As a technical means for achieving the above-described technical problems, a first aspect of the present application relates to a hybrid structure including a substrate, a fluid thin film formed on the substrate, first structures formed on the fluid thin film by primary electrohydrodynamic instability, and second structures formed between the first structures and formed by secondary electrohydrodynamic instability, in which the first structures have hydrophobicity, and the second structures have hydrophilicity.

According to one embodiment of the present application, the hybrid structure may have anisotropic hydrophilicity, but the present application is not limited thereto.

According to one embodiment of the present application, water vapor in contact with the hybrid structure due to the anisotropic hydrophilicity may be formed into droplets on the surface of the second structures, and the droplets may be arranged along the first structures, but the present application is not limited thereto.

According to one embodiment of the present application, the first structures and the second structures may be formed by a voltage applied to the substrate and the fluid thin film, but the present application is not limited thereto.

According to one embodiment of the present application, the first structures and the second structures may have an geometrical array (凹凸) pattern, and the height of the cross-sectional geometrical array of the geometrical array structure of the first structures may have a value greater than the height of the cross-sectional geometrical array of the geometrical array structure of the second structures, but the present application is not limited thereto.

According to one embodiment of the present application, the difference between the maximum height of the geometrical array structure of the first structures and the maximum height of the geometrical array structure of the second structures may be 100 nm to 300 nm, but the present application is not limited thereto.

According to one embodiment of the present application, the angle between the direction of the first structures and the direction of gravity may be 0° to 45°, but the present application is not limited thereto.

According to one embodiment of the present application, the fluid thin film, the first structures, and the second structures may each independently contain an incompressible Newtonian fluid selected from the group consisting of polystyrene, polymethacrylate, polyvinylidene fluoride, polyvinylidene fluoride-trifluoroethylene, polyvinyl alcohol, polyvinyl acetate, polydimethylsiloxane, polyvinylpyrrolidone, ethyl cellulose, polycaprolactone, polychlorotrifluoroethylene, and combinations thereof, but the present application is not limited thereto.

Furthermore, a second aspect of the present application provides a method for manufacturing a hybrid structure, the method including the steps of forming a fluid thin film on a substrate, disposing an upper electrode having a first geometrical array structure on the fluid thin film so as to face the fluid thin film while being spaced apart from the fluid thin film, applying a voltage between the upper electrode and the substrate to form first structures having the same structure as the first geometrical array structure on the fluid thin film by primary electrohydrodynamic instability, and forming second structures having a second geometrical array structure between the first structures by secondary electrohydrodynamic instability occurred between the upper electrode and the substrate.

According to one embodiment of the present application, the second geometrical array structure may have a density proportional to $1/\tau_m$ according to the following Equation 1, but the present application is not limited thereto:

$$\tau_m = \frac{3\gamma\eta}{U^4} \frac{(\epsilon_r d - (\epsilon_r - 1)h_0)^6}{\epsilon_0^2 \epsilon_r^2 (\epsilon_r - 1)^4 h_0^3} \quad \text{[Equation 1]}$$

In Equation 1, $\gamma$ is a surface tension of the fluid thin film, $\varepsilon_r$ is a permittivity of the fluid thin film, $\varepsilon_0$ is a vacuum permittivity, U is a strength of the applied voltage, $h_0$ is a thickness of the fluid thin film, d is a distance between the upper electrode and the substrate, and $\eta$ is a viscosity of the fluid thin film.

According to one embodiment of the present application, when a voltage is applied to the upper electrode, the geometrical array structure of the upper electrode may be replicated on the fluid thin film by an electric field generated by the voltage, but the present application is not limited thereto.

According to one embodiment of the present application, the voltage may be 0.01 kV to 2 kV, but the present application is not limited thereto.

According to one embodiment of the present application, the fluid thin film, the first structures, and the second structures may each independently contain an incompressible Newtonian fluid selected from the group consisting of polystyrene, polymethacrylate, polyvinylidene fluoride, polyvinylidene fluoride-trifluoroethylene, polyvinyl alcohol, polyvinyl acetate, polydimethylsiloxane, polyvinylpyrrolidone, ethyl cellulose, polycaprolactone, polychlorotrifluoroethylene, and combinations thereof, but the present application is not limited thereto.

According to one embodiment of the present application, the hybrid structure may be manufactured at a glass transition temperature $T_g$ to a boiling point $T_b$ of the fluid thin film, but the present application is not limited thereto.

According to one embodiment of the present application, the step of forming the fluid thin film on the substrate may be performed by a method selected from the group consisting of spin coating, bar coating, Mayer rod, blade coating, spray coating, dip coating, and combinations thereof, but the present application is not limited thereto.

Furthermore, a third aspect of the present application provides a fog collector including the hybrid structure according to the first aspect.

The above-described problem-solving means are merely exemplary, and should not be construed as an intention of limiting the present application. In addition to one embodiment described above, additional embodiments may exist in the drawings and detailed description of the invention.

Effects of the Invention

According to the aforementioned means for solving the problems of the present application, the hybrid structure according to the present application can control the surface wetting phenomenon corresponding to each structure by forming two types of different structures. Accordingly, it is possible to allow structural control of surface hydrophilicity, which has been rarely reported in conventional processes, and realize surface functionalities such as moisture absorption and bacterial proliferation inhibition as well as fog collection in a physical way, and as the surface hydrophobicity is expressed due to structural properties, antifouling and waterproofing performance can be expected even without additional surface treatment.

Further, the hybrid structure according to the present application can have improved fog collection performance through a surface energy gradient unlike a general hydrophilic surface by the first structures and the second structures. At this time, the surface energy gradient according to the anisotropic arrangement of the first structures can be applied to various devices involved in the transport of fluids such as a microfluidic device and the like.

Further, the hybrid structure according to the present application can be applied to reduce drag in a hydrophilic state, and can be used for energy saving in large ships and the like.

Further, the hybrid structure according to the present application can be used in a fog collector. The fog collector including the hybrid structure can collect the fog through the surface energy gradient, and the physical shape of the surface structure so that durability, reusability, and performance reliability can be improved. In addition, the conventional fog collector using a lubricating liquid or the like does not require a separated post-treatment process so that it is possible to reduce manufacturing costs and steps.

Such a fog collector can overcome water shortage issue, improve heat exchange performance, capture liquid phase of various gaseous substances, and detect fine dust, bacteria, germs, or volatile organic compounds (VOCs) mixed with water vapor. In addition, it can be implemented on the surface of various heat and steam engines widely used in industrial sites to control heat exchange performance.

Further, the hybrid structure in the method for manufacturing a hybrid structure according to the present application can be manufactured using electrohydrodynamic instability. In this regard, the conventional electrohydrodynamic instability has been realized by adjusting the periodicity of the electric field, but there are limitations such as dielectric breakdown when the periodicity of the electric field is adjusted so that there is a disadvantage in that it is difficult to form a nanometer-level structure. However, the manufacturing method according to the present application can improve the development rate of secondary electrohydrodynamic instability by improving the applied voltage and thus improving the growth rate of the second structures compared to the growth rate of the first structures. Therefore, it is possible to describe and study the aspect of dynamics of the fluid thin film for secondary electrohydrodynamic instability, which has been predicted theoretically only or practically impossible to implement experimentally so far.

However, the effects obtainable in the present application are not limited to the above-described effects, and another effects may exist.

BRIEF DESCRIPTION OF THE DRAWINGS

FIG. 1 is a schematic diagram of a hybrid structure according to one embodiment of the present application.

FIG. 2 is a schematic diagram of a hybrid structure according to one embodiment of the present application.

FIG. 3 is a flowchart illustrating a method for manufacturing a hybrid structure according to one embodiment of the present application.

FIG. 4 is a schematic diagram illustrating a manufacturing step of a hybrid structure according to one embodiment of the present application.

FIG. 5 is a schematic diagram of a fog collector according to one embodiment of the present application.

FIG. 6 is photographs of a fog collector including a hybrid structure according to an Example of the present application.

FIG. 7(*a*) is a graph illustrating the manufacturing conditions of a hybrid structure according to an Example of the present application, and FIG. 7(*b*) is images of the hybrid structure according to the respective conditions of FIG. 7(*a*).

FIG. 8 is ones illustrating the manufacturing conditions of a hybrid structure according to an Example of the present application and characteristics of the hybrid structure manufactured as a result.

FIG. 9(*a*) is illustrates the relationship between the $h_p$ of the upper electrode and the growth rates of the first structures and the second structures when manufacturing a hybrid structure according to an Example of the present application, and FIG. 9(*b*) illustrates the formation simulation of the hybrid structure according to the growth rates of the first structures and the second structures when manufacturing the hybrid structure according to the Example.

FIGS. 10(*a*)-10(*d*) illustrate the relationships between the ratio of the growth rate of the first structures to the growth rate of the second structures, the SEM images, and the AFM measurement results when manufacturing a hybrid structure according to an Example of the present application.

FIG. 11(*a*) illustrates the surface wetting performance of a hybrid structure according to an Example of the present application, FIG. 11(*b*) is an optical microscope image of the hybrid structure, and FIG. 11(*c*) is a graph illustrating the elongation ratio of the hybrid structure.

FIG. 12 is photographs illustrating the fog collection process of a fog collector according to an Example of the present application.

FIG. 13 is a graph illustrating the fog collection performance of a fog collector according to an Example of the present application.

FIG. 14(*a*) is photographs illustrating the fog collection results of a fog collector according to an Example of the present application, and FIG. 14(*b*) is ones expressing the process of collecting a fog on the fog collector.

FIG. 15(*a*) illustrates the fog collection performance according to the angle between a fog collector according to an Example of the present application and the direction of gravity, and FIG. 15(*b*) is one illustrating the performance of the fog collector.

DETAILED DESCRIPTION OF THE EMBODIMENT

Hereinafter, embodiments of the present application will be described in detail with reference to the accompanying drawings so that those with ordinary skill in the art to which the present application pertains will easily be able to implement the present application.

However, the present application may be implemented in various different forms and is not limited to the embodiments described herein. Further, parts irrelevant to the description are omitted in order to clearly describe the present application in the drawings, and similar reference numerals are attached to similar parts throughout the specification.

In the whole specification of the present application, when a part is said to be "connected" with other part, it not only includes a case that the part is "directly connected" to the other part, but also includes a case that the part is "electrically connected" to the other part with another element being interposed therebetween.

In the whole specification of the present application, when any member is positioned "on", "over", "above", "beneath", "under", and "below" other member, this not only includes a case that the any member is brought into contact with the other member, but also includes a case that another member exists between two members.

In the whole specification of the present application, if a prescribed part "includes" a prescribed element, this means that another element can be further included instead of excluding other elements unless any particularly opposite description exists.

When unique manufacture and material allowable errors of numerical values are suggested to mentioned meanings of terms of degrees used in the present specification such as "about", or "substantially", the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of constituent elements described in the Markush type expression, means including one or more selected from the group consisting of the constituent elements.

In the whole specification of the present application, description of "A and/or B" means "A or B, or A and B".

Hereinafter, a hybrid structure according to the present application, a method for manufacturing the same, and a fog collector including the same will be described in detail with reference to embodiments, Examples, and drawings. However, the present application is not limited to such embodiments, Examples, and drawings.

As a technical means for achieving the above-described technical problems, the first aspect of the present application relates to a hybrid structure 10 including a substrate 100, a fluid thin film 400 formed on the substrate 100, first structures 200 formed on the fluid thin film 400 by primary electrohydrodynamic instability, and second structures 300 formed between the first structures 200 and formed by secondary electrohydrodynamic instability, in which the first structures 200 have hydrophobicity, and the second structures 300 have hydrophilicity.

Electrohydrodynamic instability according to the present application means that a thin film containing a fluid is deformed by a strong electric field. Specifically, when a strong electric field is applied to a thin film containing a fluid, the surface of the thin film may be structurally deformed while it becomes unstable. As will be described later, when a strong electric field is applied to the thin film using a standardized fine pattern, the spatial distribution of the electric field reflects the structural characteristics of the fine pattern, and due to this, structural deformation of the thin film is controlled so that the thin film may be duplicated so as to have the same shape as the fine pattern. In this regard, the thin film may only have the same structure as the fine pattern, and the height of the structure formed by deforming the thin film may be different from the height of the fine pattern.

In general, since electrohydrodynamic instability is affected by the strength of an electric field, the structure of the thin film may be actively deformed as it is closer to the geometrical array of the fine pattern.

In this regard, under certain circumstances, structural deformation may be observed even in regions far from a non-geometrical array portion or a geometrical array portion, where the strength of the electric field is weak, and this may be called secondary electrohydrodynamic instability since it is induced after the thin film close to the geometrical array portion is deformed. In electrohydrodynamic instability like this, deformation may be repeated like this until the surface energy of the thin film becomes the lowest.

A thin film containing the extra fluid exists even after the pattern is formed by the primary electrohydrodynamic instability, and the secondary electrohydrodynamic instability is known to occur when the natural wavelength describing the dominant static features of the thin film flow is smaller than the period of the electric field strength. However, in the case of the method of inducing electrohydrodynamic instability by controlling the natural wavelength, since it may cause problems such as dielectric breakdown, the existing patterning technique using electrohydrodynamic instability may make it difficult to induce reproducible and controllable secondary electrohydrodynamic instability.

However, the hybrid structure 10 according to the present application and the method for manufacturing the same provide a hybrid structure 10 which controls $1/\tau_m$, which is the growth rate of the first structures 200 and the second structures 300 for the induction of secondary electrohydrodynamic instability, to induce secondary electrohydrodynamic instability, and which is manufactured by such a method to include two types of different structures.

FIGS. 1 and 2 are schematic diagrams of a hybrid structure 10 according to one embodiment of the present application.

Referring to FIG. 1, the hybrid structure 10 may include first structures 200 formed on a substrate 100 and second structures 300 formed between the first structures 200. As will be described later, the first structures 200 and the second structures 300 may be formed by electrohydrodynamic instability, and the shape of the first structures 200 and the shape of the second structures 300 may be different. In this regard, although the expression of the fluid thin film 400 is omitted in FIG. 1, a fluid thin film 400 may exist between the first structures 200 and the second structures 300, and the substrate 100.

Further, referring to FIG. 2, the hybrid structure 10 may be formed through interaction with the upper electrode 500, and at this time, the growth rates of the first structures 200 and the second structures 300 may be determined by the distance d between the upper electrode 500 and the substrate 100, the height $h_p$ of the pattern of the upper electrode 500, and the like.

According to one embodiment of the present application, the first structures 200 and the second structures 300 may include each independently a structure selected from the group consisting of a straight rod-shaped structure, a polygonal columnar structure, a polygonal pyramidal structure, a cylindrical structure, a conical structure, a geometrical array structure, and combinations thereof, but the present application is not limited thereto.

According to one embodiment of the present application, the hybrid structure 10 may have anisotropic hydrophilicity, but the present application is not limited thereto.

According to one embodiment of the present application, water vapor in contact with the hybrid structure 10 due to the anisotropic hydrophilicity may be formed into droplets on the surface of the second structures 300, and the droplets may be arranged along the first structures 200, but the present application is not limited thereto.

The first structures 200 are ones formed by primary electrohydrodynamic instability, and may have a hydrophobic structure generated by a surface energy gradient according to the geometrical arrangement of the first structures 200, whereas the second structures 300 are formed by secondary electrohydrodynamic instability, and may have a hydrophilic structure by being dense and having a low aspect ratio. That is, the hybrid structure 10 may form a hydrophobic-hydrophilic alternating surface, in which a hydrophobic surface and a hydrophilic surface appear alternately, and an 'anisotropic hydrophilicity' by a specific directionality of the pattern of the first structures 200 may be realized.

The anisotropic hydrophilicity according to the present application, as one which means that the wetting of a specific surface of an object is arranged according to a spatial direction, is one in which a surface energy gradient is implemented on the surface of the object. When the object has anisotropic hydrophobicity, the properties of the object repelling water droplets may be realized according to a specific direction, and when the object has anisotropic hydrophilicity, the properties of adsorbing water droplets on the surface of the object may be realized according to a specific direction.

In the hybrid structure 10 according to the present application, liquefaction of water vapor occurs according to the arrangement direction of the pattern of the first structures 200. Due to a difference in the surface energy between the first structures 200 and the second structures 300, water droplets may be easily transported in the hybrid structure 10 compared to a structure including only the first structures 200 or a structure including only the second structures 300.

As will be described later, the first structures 200 may have hydrophobicity by replicating the hydrophobic pattern of the upper electrode 500 due to primary electrohydrodynamic instability, and the second structures 300 may have hydrophilicity by being densely formed due to secondary electrohydrodynamic instability.

Specifically, the hydrophilic surface of the second structures 300 has excellent condensation performance, but the overall collection performance may be reduced due to the adhesion force between water and the surface, and the hydrophobic surface of the first structures 200 may quickly transport collected water droplets, but there is a disadvantage in that the overall condensation performance is low. However, the hybrid structure 10 according to the present application may improve the collection performance by enabling the water droplets collected by the gradient of the surface energy of the first structures 200 and the second structures 300 to be arranged in a specific direction.

According to one embodiment of the present application, the first structures 200 and the second structures 300 may be formed by a voltage applied to the substrate 100 and the fluid thin film 400, but the present application is not limited thereto. Specifically, the first structures 200 and the second structures 300 may be formed by an electric field generated by the voltage between the substrate 100 and the upper electrode 500 to be described later.

As will be described later, the first structures 200 and the second structures 300 are ones formed by an electric field, and may be ones formed by deforming the fluid thin film 400 by an electric field.

According to one embodiment of the present application, the first structures 200 and the second structures 300 may have geometrical array (凹凸) structures, and the height of the cross-sectional geometrical array of the geometrical array structure of the first structures 200 may have a value greater than the height of the cross-sectional geometrical array of the geometrical array structure of the second structures 300, but the present application is not limited thereto. Specifically, referring to FIGS. 1 and 2, the second structures 300 may be a small geometrical array structure located inside the geometrical array structure of the first structures 200.

According to one embodiment of the present application, a difference between the maximum height of the geometrical array structure of the first structures 200 and the maximum height of the geometrical array structure of the second structures 300 may be 100 nm to 300 nm, but the present application is not limited thereto.

The difference between the maximum heights of the geometrical array structures is to control electrohydrodynamic instability (primary instability) for forming the first structures 200 and electrohydrodynamic instability (secondary instability) for forming the second structures 300.

This means that the smaller the difference between the maximum height of the geometrical array structure of the first structures 200 and the maximum height of the geometrical array structure of the second structures 300 is, the growth rate of the first structures 200 and the growth rate of the second structures 300 are similar. At this time, the closer the ratio of the growth rate of the first structures 200 to the growth rate of the second structures 300 is to 1, the height difference between the geometrical array structure of the first structures 200 and the geometrical array structure of the second structures 300 may not occur, and in this case, the anisotropic hydrophilicity is not realized so that the condensation performance of the hybrid structure 10 may deteriorate.

Meanwhile, as the ratio of the growth rate of the first structures 200 to the growth rate of the second structures 300 increases, the difference between the maximum height of the geometrical array structure of the first structures 200 and the maximum height of the geometrical array structure of the second structures 300 may become large, but in this case, water is not condensed by the second structures 300 so that the water collection performance may deteriorate.

According to one embodiment of the present application, the angle between the direction of the first structures 200 and the direction of gravity may be 0° to 45°, but the present application is not limited thereto. The description of "direction of the first structures" according to the present application may refer to a direction in which the substrate 100 extends in two dimensions, and may be a direction perpendicular to the direction of perpendicularly penetrating the first structures 200 or the second structures 300 from the substrate 100.

When the direction of the first structures 200 and the direction of gravity coincide, that is, when the substrate 100 of the hybrid structure 10 is positioned in a direction perpendicular to the ground, the fog collection performance of the hybrid structure 10 may be improved.

According to one embodiment of the present application, the fluid thin film 400, the first structures 200, and the second structures 300 may each independently contain an incompressible Newtonian fluid selected from the group consisting of polystyrene, polymethacrylate, polyvinylidene fluoride, polyvinylidene fluoride-trifluoroethylene, polyvinyl alcohol, polyvinyl acetate, polydimethylsiloxane, polyvinylpyrrolidone, ethyl cellulose, polycaprolactone, polychlorotrifluoroethylene, and combinations thereof, but the present application is not limited thereto.

The incompressible Newtonian fluid according to the present application means a fluid that obeys Newton's law of viscosity while ignoring change in density when subjected to a physical phenomenon.

As will be described later, since the fluid thin film 400 is deformed by electrohydrodynamic instability to form the first structures 200 and the second structures 300, the fluid thin film 400, the first structures 200, and the second structures 300 may be the same material.

According to one embodiment of the present application, the hybrid structure 10 may have a contact angle of 40° to 90°, but the present application is not limited thereto.

The contact angle according to the present application means an angle formed when a liquid and a gas achieve thermodynamic equilibrium on a solid surface, and may express the wettability of the solid surface. Hydrophobicity and hydrophilicity may be classified according to the contact angle.

The droplets formed on the second structures 300 may have a circular or elliptical cross-sectional shape, but the present application is not limited thereto.

At this time, when the droplets have an elliptical cross-sectional shape, an elongation ratio indicating anisotropic wetting of the hybrid structure 10 may be expressed through a ratio of the minor axis to the major axis. As will be described later, the elongation ratio may have a tendency to be proportional to the contact angle, which means that the larger the elongation ratio is, that is, the closer the cross section of the droplets is to an ellipse, the more the hybrid structure 10 is affected by hydrophobicity of the first structures 200.

Furthermore, the second aspect of the present application provides a method for manufacturing a hybrid structure 10, the method including the steps of forming a fluid thin film 400 on a substrate 100, disposing an upper electrode 500 having a first geometrical array structure on the fluid thin film 400 so as to face the fluid thin film 400 while being spaced apart from the fluid thin film 400, applying a voltage between the upper electrode 500 and the substrate 100 to form first structures 200 having the same structure as the first geometrical array structure on the fluid thin film 400 by primary electrohydrodynamic instability, and forming second structures 300 having a second geometrical array structure between the first structures 200 by secondary electrohydrodynamic instability occurred between the upper electrode 500 and the substrate 100.

FIG. 3 is a flowchart illustrating a method for manufacturing a hybrid structure 10 according to one embodiment of the present application, and FIG. 4 is a schematic diagram illustrating a manufacturing step of a hybrid structure 10 according to one embodiment of the present application. Specifically, FIG. 4 is one illustrating a process in which the second structures 300 are formed after the first structures 200 are formed in the hybrid structure 10.

First, the fluid thin film 400 is formed on the substrate 100 (S100).

According to one embodiment of the present application, the step of forming the fluid thin film 400 on the substrate 100 may be performed by a method selected from the group consisting of spin coating, bar coating, Mayer rod, blade coating, spray coating, dip coating, and combinations thereof, but the present application is not limited thereto.

According to one embodiment of the present application, the fluid thin film 400 may contain an incompressible Newtonian fluid selected from the group consisting of polystyrene, polymethacrylate, polyvinylidene fluoride, polyvinylidene fluoride-trifluoroethylene, polyvinyl alcohol, polyvinyl acetate, polydimethylsiloxane, polyvinylpyrrolidone, ethyl cellulose, polycaprolactone, polychlorotrifluoroethylene, and combinations thereof, but the present application is not limited thereto. At this time, as the first structures 200 and the second structures 300 to be described later are formed by structural deformation of the fluid thin film 400, the fluid thin film 400, the first structures 200, and the second structures 300 may contain the same material.

Subsequently, an upper electrode 500 having a first geometrical array structure is disposed on the fluid thin film 400 to face the fluid thin film 400 while being spaced apart from the fluid thin film 400 (S200).

According to one embodiment of the present application, the substrate 100 and the upper electrode 500 may have a storage battery structure, but the present application is not limited thereto. Referring to FIG. 4, the upper electrode 500 and the substrate 100 may have an external power supply applied thereto, and as will be described later, when a voltage is applied to form the first structures 200 and the second structures 300, an electric field should be formed between the substrate 100 and the upper electrode 500.

The distance d between the substrate 100 and the upper electrode 500 and the $h_p$, which is the height of the first geometrical array structure, are variables that are not fixed values, and may affect the formation of the first structures 200 and the second structures 300 to be described later.

According to one embodiment of the present application, the upper electrode 500 may have a first geometrical array structure, but the present application is not limited thereto. The first structures 200 to be described later may have the same structure as the first geometrical array structure.

As will be described later, the height $h_p$ of the geometrical array portion or the non-geometrical array portion of the upper electrode 500 may be controlled.

Subsequently, the first structures 200 having the same structure as the first geometrical array structure are formed on the fluid thin film 400 due to primary electrohydrodynamic instability by applying a voltage between the upper electrode 500 and the substrate 100 (S300).

According to one embodiment of the present application, when a voltage is applied to the upper electrode 500, the geometrical array structure of the upper electrode 500 may be replicated on the fluid thin film 400 by an electric field generated by the voltage, but the present application is not limited thereto. When the voltage is applied, a strong electric field is applied to the fluid thin film 400 so that the surface of the fluid thin film 400 may become unstable, and thus structural deformation may occur. At this time, the spatial distribution of the electric field can reflect the first geometrical array structure of the upper electrode 500 by the first geometrical array structure of the upper electrode 500 so that a fine pattern reflecting the geometrical array structure of the upper electrode 500 may be formed on the fluid thin film 400, and the geometrical array structure formed on the fluid thin film 400 may be the first structures 200.

In this regard, after the first structures 200 are formed, the geometrical array structure of the upper electrode 500 may be deformed.

In this regard, the geometrical array structure of the first structures 200 may have the same shape as the first geometrical array structure of the upper electrode 500, but the height of the geometrical array structure of the first structures 200 and the height of the geometrical array structure of the upper electrode 500 may be different.

In general, electrohydrodynamic instability may imply the deformation process of the surface structure with time in order to lower the free energy stored in the system, and the thin film fluctuation due to electrohydrodynamic instability may be determined by the characteristic wavelength $\lambda_m$ analyzed in electrohydrodynamics. At this time, the characteristic wavelength corresponds to Equation 2 below.

[Equation 2]

$$\lambda_m = \frac{2\pi}{U}\sqrt{\frac{2\gamma((\epsilon_r d - \epsilon_r - 1)h_0)^3}{\epsilon_0\epsilon_r(\epsilon_r - 1)}}$$

In Equation 2, $\gamma$ is a surface tension of the fluid thin film 400, $\varepsilon_r$ is a permittivity of the fluid thin film 400, $\varepsilon_0$ is a vacuum permittivity, U is a strength of the applied voltage, and $h_0$ is a thickness of the fluid thin film 400.

Secondary electrohydrodynamic instability for forming the second structures 300 to be described later may be induced when the wavelength $\lambda_p$ of the generated electric field is larger than the characteristic wavelength, but reducing the characteristic wavelength to a size of 1 μm or less has a disadvantage in that reappearance is difficult due to restrictions such as dielectric breakdown. The present application presents a method for forming the second structures 300 by increasing the development rate of relatively slow secondary electrohydrodynamic instability by increasing $1/\tau_m$, which is a reciprocal of the characteristic time expressing the growth rates of the first structures 200 and the second structures 300 that is to be described later.

Subsequently, second structures 300 having a second geometrical array structure are formed between the first structures 200 by secondary electrohydrodynamic instability occurred between the upper electrode 500 and the substrate 100 (S400).

In this regard, the secondary electrohydrodynamic instability may occur by adjusting the strength of the electric field after forming the first structures 200. That is, the positional relationship between the upper electrode 500 and the substrate 100 when the first structures 200 are formed, and the positional relationship between the upper electrode 500 and the substrate 100 when the second structures 300 are formed may be slightly different.

According to one embodiment of the present application, before secondary electrohydrodynamic instability occurs before the voltage is applied or after the voltage is applied, the distance between the upper electrode 500 and the substrate 100 or the height of the first structures 200 may be adjusted, but the present application is not limited thereto.

According to one embodiment of the present application, the second geometrical array structure may have a density proportional to $1/\tau_m$ according to the following Equation 1, but the present application is not limited thereto:

$$\tau_m = \frac{3\gamma\eta}{U^4}\frac{(\epsilon_r d-(\epsilon_r-1)h_0)^6}{\epsilon_0^2\epsilon_r^2(\epsilon_r-1)^4 h_0^3} \qquad \text{[Equation 1]}$$

In Equation 1, $\gamma$ is a surface tension of the fluid thin film 400, $\varepsilon_r$ is a permittivity of the fluid thin film 400, $\varepsilon_0$ is a vacuum permittivity, U is a strength of the applied voltage, $h_0$ is a thickness of the fluid thin film 400, d is a distance between the upper electrode 500 and the substrate 100, and $\eta$ is a viscosity of the fluid thin film 400.

Referring to Equation 1, as the strength of the applied voltage increases, the viscosity of the fluid thin film 400 decreases, or the height difference between the first geometrical array structure and the second geometrical array structure decreases (that is, as the maximum height difference between the two geometrical array structures decreases), the density of the second geometrical array structure increases so that the second geometrical array structure may be densely formed.

In this regard, the rate at which the first structures 200 are formed by primary electrohydrodynamic instability may be referred to as $1/\tau_m^{1st}$, and the rate at which the second structures 300 are formed by secondary electrohydrodynamic instability may be referred to as $1/\tau_m^{2nd}$. Specifically, $1/\tau_m^{1st}$ means a primary electrohydrodynamic instability inducing region which is a corresponding thin film region under the geometrical array structure of the upper electrode 500, that is, a rate at which the first structures 200 are formed, and $1/\tau_m^{2nd}$ means a secondary electrohydrodynamic instability inducing region which is a corresponding thin film region under the non-geometrical array structure of the upper electrode 500, that is, a rate at which the second structures 300 are formed.

Referring to Equation 1, the growth rate $\tau_m$ of the first structures 200 and the second structures 300 may be adjusted by the distance d between the substrate 100 and the upper electrode 500 and the applied voltage U.

A ratio of the growth rate $1/\tau_m^{1st}$ of the first structures 200 to the growth rate $1/\tau_m^{2nd}$ of the second structures 300 may be defined as in Equation 3 below.

$$\frac{\tau_m^{2nd}}{\tau_m^{1st}} = \frac{(\epsilon_r d-(\epsilon_r-1)h_0)^6}{(\epsilon_r(d-h_p)-(\epsilon_r-1)h_0)^6} \qquad \text{[Equation 3]}$$

Referring to Equation 3 above, the difference between the growth rate of the first structures 200 and the growth rate of the second structures 300 may be adjusted by the height $h_p$ of the geometrical array portion of the geometrical array structure of the upper electrode 500 and the distance d between the substrate 100 and the upper electrode 500. That is, the growth rates of the first structures 200 and the second structures 300 may be efficiently controlled by efficiently controlling d and $h_p$.

In this regard, the first structures 200 may be formed by the geometrical array portion of the upper electrode 500, and the second structures 300 may be formed by the non-geometrical array portion of the upper electrode 500. The development rate of electrohydrodynamic instability at the lower end of the non-geometrical array portion of the upper electrode 500 may be defined by $\tau_0/\tau_m^{2nd}$, and when $\tau_0/\tau_m^{2nd}$ approaches 1, only the first structures 200 may be formed, but as $\tau_0/\tau_m^{2nd}$ increases, the free energy rapidly decreases, but the second structures 300 may be formed at the same time. In this regard, $1/\tau_0$ is a rate constant of electrohydrodynamic instability, and is one which is for simply expressing the values of primary electrohydrodynamic instability and secondary electrohydrodynamic instability, meaning 15,703.3 $s^{-1}$.

In this regard, the upper electrode 500 when forming the first structures 200 may be the same as the upper electrode 500 when forming the second structures 200. However, since the first structures 200 are formed while replicating the geometrical array structure of the upper electrode 500, whereas the second structures 300 are formed in a form of extending to the perimeter of the first structures 200 after the first structures 200 are formed, the second structures 300 do not replicate the geometrical array structure of the upper electrode 500, but the upper electrode 500 may provide an electric field required for forming the second structures 300. That is, as the upper electrode for forming the second structures 300 is for simply applying an electric field only, the upper electrode 500 for forming the first structures 200 may be the same as or different from the upper electrode 500 for forming the second structures 300.

According to one embodiment of the present application, the ratio ($\tau_m^{2nd}/\tau_m^{1st}$) between the growth rate of the first structures 200 and the growth rate of the second structures 300 may be 1 to 3, but the present application is not limited thereto.

According to one embodiment of the present application, the voltage may be 0.01 kV to 2 kV, but the present application is not limited thereto.

According to one embodiment of the present application, the hybrid structure 10 may be manufactured at a glass transition temperature $T_g$ to a vaporization point $T_b$ of the fluid thin film 400, but the present application is not limited thereto.

The fluid thin film 400 is structurally deformed by an electric field. Accordingly, when the fluid thin film 400 is in a completely solid phase, structural deformation may not occur, and for this purpose, it is necessary to impart fluidity by sufficiently increasing the temperature of the fluid thin film 400.

According to one embodiment of the present application, the substrate 100 may include one selected from the group consisting of Si, $SiO_2$, ITO, FTO, glass, and combinations thereof, but the present application is not limited thereto.

As described above, as the substrate 100, a flat rigid substrate is suitable for applying a uniform electric field in the storage battery structure and for a uniform surface of the fluid thin film 400.

Further, the third aspect of the present application provides a fog collector (not shown) including the hybrid structure 10 according to the first aspect.

The fog collector is a device for collecting fine water droplets floating in the air, but may collect droplets of substances that can be sprayed while present in a liquid state at room temperature such as ethanol, and methanol, in addition to water ($H_2O$) droplets.

FIG. 5 is a schematic diagram of a fog collector according to one embodiment of the present application, and is one illustrating when water vapor is supplied from a humidifier to a fog collector including the hybrid structure 10.

According to one embodiment of the present application, the fog collector may have a fog collection efficiency of 150 mg/cm$^2$ to 300 mg/cm$^2$, but the present application is not limited thereto. For example, the fog collector may have a fog collection efficiency of about 150 g/cm$^2$ to about 300 g/cm$^2$, about 160 g/cm$^2$ to about 300 g/cm$^2$, about 170 g/cm$^2$ to about 300 g/cm$^2$, about 180 g/cm$^2$ to about 300 g/cm$^2$, about 190 g/cm$^2$ to about 300 g/cm$^2$, about 200 g/cm$^2$ to about 300 g/cm$^2$, about 210 g/cm$^2$ to about 300 g/cm$^2$, about 220 g/cm$^2$ to about 300 g/cm$^2$, about 230 g/cm$^2$ to about 300 g/cm$^2$, about 240 g/cm$^2$ to about 300 g/cm$^2$, about 250 g/cm$^2$ to about 300 g/cm$^2$, about 260 g/cm$^2$ to about 300 g/cm$^2$, about 270 g/cm$^2$ to about 300 g/cm$^2$, about 280 g/cm$^2$ to about 300 g/cm$^2$, about 290 g/cm$^2$ to about 300 g/cm$^2$, about 150 g/cm$^2$ to about 160 g/cm$^2$, about 150 g/cm$^2$ to about 170 g/cm$^2$, about 150 g/cm$^2$ to about 180 g/cm$^2$, about 150 g/cm$^2$ to about 190 g/cm$^2$, about 150 g/cm$^2$ to about 200 g/cm$^2$, about 150 g/cm$^2$ to about 210 g/cm$^2$, about 150 g/cm$^2$ to about 220 g/cm$^2$, about 150 g/cm$^2$ to about 230 g/cm$^2$, about 150 g/cm$^2$ to about 240 g/cm$^2$, about 150 g/cm$^2$ to about 250 g/cm$^2$, about 150 g/cm$^2$ to about 260 g/cm$^2$, about 150 g/cm$^2$ to about 270 g/cm$^2$, about 150 g/cm$^2$ to about 280 g/cm$^2$, about 150 g/cm$^2$ to about 290 g/cm$^2$, about 160 g/cm$^2$ to about 270 g/cm$^2$, about 170 g/cm$^2$ to about 260 g/cm$^2$, about 180 g/cm$^2$ to about 250 g/cm$^2$, about 190 g/cm$^2$ to about 240 g/cm$^2$, about 200 g/cm$^2$ to about 230 g/cm$^2$, or about 210 g/cm$^2$ to about 220 g/cm$^2$, but the present application is not limited thereto.

Hereinafter, the present disclosure will be described in more detail through Examples, but the following Examples are for illustrative purposes only and are not intended to limit the scope of the present application.

EXAMPLE

A solution of about 2.5 wt % in which polystyrene was diluted in toluene was applied on a substrate by spin coating to form a polystyrene thin film with a thickness of about 500 nm. Subsequently, an upper electrode having a 5 μm cycle micro hole pattern attached thereto to distinguish the geometrical array portion and the non-geometrical array portion was disposed to be spaced apart from the surface of the thin film by about 2.6 μm to 5 μm so that it faces the polystyrene thin film. Subsequently, electrohydrodynamic patterning was performed on the polystyrene thin film by imparting a potential difference of 0.1 kV to 1.6 kV between the upper electrode and the substrate for about 20 seconds. The ratio of $\tau_m^{2nd}/\tau_m^{1st}$ was adjusted by adjusting the distance and potential difference between the electrode and the surface of the thin film, and the hybrid structure manufactured accordingly was divided into P1 ($\tau_m^{2nd}/\tau_m^{1st}$=2.457), P2 ($\tau_m^{2nd}/\tau_m^{1st}$=1.541), P3 ($\tau_m^{2nd}/\tau_m^{1st}$=1.204), and P4 ($\tau_m^{2nd}/\tau_m^{1st}$=1.082).

FIG. 6 is photographs of a fog collector including a hybrid structure according to an Example of the present application. Referring to FIG. 6, the hybrid structure may be disposed at a predetermined angle with the supply direction of water vapor and the direction of gravity, and the water vapor forms a water puddle at the end of the hybrid structure so that it may flow to the lower portion of the structure (droplet fall).

Experimental Example 1

(a) of FIG. 7 is a graph illustrating the manufacturing conditions of a hybrid structure according to an Example of the present application, and (b) of FIG. 7 is images of the hybrid structure according to the respective conditions of (a) of FIG. 7. Specifically, in order to induce secondary electrohydrodynamic instability, FIG. 7, as ones for comparing a method of controlling $\lambda_m/\lambda_p$ with a method of controlling a growth rate ($1/\tau_m$) for inducing secondary electrohydrodynamic instability, is ones for introducing a rate difference for inducing secondary electrohydrodynamic instability.

Referring to FIG. 7, when $\lambda_m/\lambda_p$ approaches 1, a large difference may not occur depending on the difference in growth rates ((1) and (3) of (b) of FIG. 7). However, when $\lambda_m/\lambda_p$ becomes small, that is, when 4 decreases, the second structures may not be densely formed depending on the growth rate ((2) of (b) of FIG. 7). On the other hand, even if $\lambda_m$ is small, if the growth rate becomes large, the second structures may be densely formed, and this means that hydrophilicity of the hybrid structure is improved.

Experimental Example 2

FIG. 8 is ones illustrating the manufacturing conditions of a hybrid structure according to an Example of the present application and characteristics of the hybrid structure manufactured as a result. Specifically, (a) of FIG. 8 shows a change in surface free energy according to the ratio of $\tau_0/\tau_m^{2nd}$ and a generation simulation of the second structures accordingly, (b) of FIG. 8 is SEM images according to the ratio of $\tau_0/\tau_m^{2nd}$ (c) and (d) of FIG. 8 respectively show a simulation in which secondary electrohydrodynamic instability is dampened in the region where the second structures are to be formed and that the secondary electrohydrodynamic instability is induced, according to the ratio of $\tau_0/\tau_m^{2nd}$ and the descriptions of 198 nm to 368 nm and 21 nm to 375 nm at the bottom of (c) and (d) of FIG. 8 mean the minimum and maximum values of the height of the hybrid structure under the manufacturing conditions.

Referring to FIG. 8, as $\tau_0/\tau_m^{2nd}$ is closer to 1, the second structures may not be formed, and this means that even if the hybrid structure is not formed, or it is formed, hydrophilicity due to the second structures is weakly formed.

Experimental Example 3

(a) of FIG. 9 is one illustrating the relationship between the $h_p$ of the upper electrode and the growth rates of the first structures and the second structures when manufacturing a hybrid structure according to an Example of the present application, and (b) of FIG. 9 is ones illustrating the formation simulation of the hybrid structure according to the growth rates of the first structures and the second structures when manufacturing the hybrid structure according to the Example, and (a) to (d) of FIG. 10 are ones illustrating the relationships between the ratio of the growth rate of the first structures to the growth rate of the second structures, the SEM images, and the AFM measurement results when manufacturing a hybrid structure according to an Example of the present application. At this time, 200 nm in FIG. 10 is a scale bar.

Referring to FIGS. 9 and 10, $\tau_m^{1st}/\tau_m^{2nd}$ may vary depending on the height $h_p$ of the geometrical array portion of the upper electrode, and as $\tau_m^{1st}/\tau_m^{2nd}$ is smaller, the first structures described as having a quadrangle structure and the second structures described as a small granular structure in FIGS. 9 and 10 may be clearly divided. For example, in the case of P1 ($\tau_m^{2nd}/\tau_m^{1st}$=2.457), division of the first structures and the second structures may be clearly made, and in the case of P4 ($\tau_m^{2nd}/\tau_m^{1st}$=1.082), division of the first structures and the second structures may be unclearly made.

Experimental Example 4

(a) of FIG. 11 is one illustrating the surface wetting performance of a hybrid structure according to an Example of the present application, (b) of FIG. 11 is an optical microscope image of the hybrid structure, and (c) of FIG. 11 is a graph illustrating the elongation ratio of the hybrid structure.

Referring to FIG. 11, as $\tau_m^{2nd}/\tau_m^{1st}$ increases, it may be similar to a contact angle (CA) of a typical PS thin film, which means that as $\tau_m^{2nd}/\tau_m^{1st}$ increases, the formation of the second structures is not made.

Experimental Example 5

FIG. 12 is photographs illustrating the fog collection process of a fog collector according to an Example of the present application, FIG. 13 is a graph illustrating the fog collection performance of a fog collector according to an Example of the present application, (a) of FIG. 14 is photographs illustrating the fog collection results of a fog collector according to an Example of the present application, and (b) of FIG. 14 is ones expressing the process of collecting a fog on the fog collector. At this time, FIG. 14 is ones comparing the water collection abilities according to the water vapor supply times for P3.

Referring to FIG. 13, the fog collection performance (water collection) may vary depending on the size of $\tau_m^{2nd}/\tau_m^{1st}$, and at this time, since the first structures are not formed when $\tau_m^{2nd}/\tau_m^{1st}$ is too small (P4), it can be confirmed that there is no hydrophobic region so that the fog collection performance is lowered.

Further, referring to FIG. 14, when water vapor is supplied to the fog collector, a water droplet nucleation is formed, and after it grows, coalescence may occur. At this time, the formation of the water droplet nuclei and the like may be made on the hydrophilic surface of the second structures of the hybrid structure, and the large water droplets formed by coalescing them may move along the hydrophobic surface of the first structures.

Experimental Example 6

(a) of FIG. 15 is one illustrating the fog collection performance according to the angle between a fog collector according to an Example of the present application and the direction of gravity, and (b) of FIG. 15 is one illustrating the performance of the fog collector. In this regard, 105° and 175° of (a) of FIG. 15 may mean a case where the angles between the fog collector and the direction of gravity are 75° and 5° respectively.

Referring to FIG. 15, it can be confirmed that the fog collecting ability is improved as the angle between the fog collector and the direction of gravity is small. Particularly, it was confirmed that the P3 fog collector has a water collection ability of about 200 mg/cm$^2$ per hour even after using it 50 times or more.

The foregoing description of the present application is for illustration, and those with ordinary skill in the art to which the present application pertains will be able to understand that it can be easily modified into other specific forms without changing the technical spirit or essential features of the present application. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present application is indicated by the claims to be described later rather than the above detailed description, and all changes or modified forms derived from the meaning and scope of the claims and equivalent concepts thereof should be construed as being included in the scope of the present application.

EXPLANATION OF MARKS

10: hybrid structure
100: substrate
200: first structure
300: second structure
400: fluid thin film
500: upper electrode

What is claimed is:

1. A hybrid structure comprising:
a substrate;
a fluid thin film formed on the substrate;
first structures formed on the fluid thin film by primary electrohydrodynamic instability; and
second structures formed between the first structures and formed by secondary electrohydrodynamic instability,
wherein the first structures have hydrophobicity and form a plurality of parallel ridges, and
wherein the second structures have hydrophilicity and are distributed in a form of isolated peaks located in valleys between the first structures.

2. The hybrid structure of claim 1, wherein the hybrid structure has anisotropic hydrophilicity.

3. The hybrid structure of claim 2, wherein water vapor in contact with the hybrid structure due to the anisotropic hydrophilicity is formed into droplets on the surface of the second structures, and the droplets are arranged along the first structures.

4. The hybrid structure of claim 1, wherein the first structures and the second structures are formed by a voltage applied to the substrate and the fluid thin film.

5. The hybrid structure of claim 4, wherein a height of the first structures has a value greater than a height of the second structures.

6. The hybrid structure of claim 5, wherein a difference between a maximum height of the first structures and a maximum height of the second structures is 100 nm to 300 nm.

7. The hybrid structure of claim 1, wherein an angle between a direction of the first structures and a direction of gravity is 0° to 45°.

8. The hybrid structure of claim 1, wherein the fluid thin film, the first structures, and the second structures each independently contain an incompressible Newtonian fluid selected from the group consisting of polystyrene, polymethacrylate, polyvinylidene fluoride, polyvinylidene fluoride-trifluoroethylene, polyvinyl alcohol, polyvinyl acetate, polydimethylsiloxane, polyvinylpyrrolidone, ethyl cellulose, polycaprolactone, polychlorotrifluoroethylene, and combinations thereof.

9. A fog collector including the hybrid structure according to claim 1.

* * * * *